US010981530B2

(12) United States Patent
Nakamura et al.

(10) Patent No.: US 10,981,530 B2
(45) Date of Patent: Apr. 20, 2021

(54) KNEE-AIRBAG-DEVICE ATTACHMENT STRUCTURE OF VEHICLE

(71) Applicant: MAZDA MOTOR CORPORATION, Hiroshima (JP)

(72) Inventors: Satoru Nakamura, Hiroshima (JP); Hideharu Kaeriyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 180 days.

(21) Appl. No.: 16/294,826

(22) Filed: Mar. 6, 2019

(65) Prior Publication Data
US 2019/0299901 A1 Oct. 3, 2019

(30) Foreign Application Priority Data

Mar. 29, 2018 (JP) .............................. JP2018-063733

(51) Int. Cl.
*B60R 21/206* (2011.01)
*B62D 25/14* (2006.01)
*B62D 25/20* (2006.01)
*B60R 21/231* (2011.01)
(Continued)

(52) U.S. Cl.
CPC .......... *B60R 21/206* (2013.01); *B60R 21/231* (2013.01); *B62D 25/14* (2013.01); *B62D 25/145* (2013.01); *B62D 25/2018* (2013.01); *B60R 2021/0051* (2013.01); *B60R 2021/23169* (2013.01); *B62D 25/04* (2013.01)

(58) Field of Classification Search
CPC ................ B60R 21/206; B60R 21/231; B60R 2021/23169; B60R 2021/0051; B62D 25/04; B62D 25/2018
See application file for complete search history.

(56) References Cited

U.S. PATENT DOCUMENTS 3,784,223 A * 1/1974 Hass ................... B60R 21/2032
280/730.1
5,385,383 A * 1/1995 Kreis ..................... B62D 25/04
16/249
(Continued)

FOREIGN PATENT DOCUMENTS

DE 19906447 A1 8/2000
DE 10312597 A1 9/2004
(Continued)

OTHER PUBLICATIONS

The extended European search report issued by the European Patent Office dated Jul. 5, 2019, which corresponds to European Patent Application No. 19158978.7-1132 and is related to U.S. Appl. No. 16/294,826.

*Primary Examiner* — Frank B Vanaman
(74) *Attorney, Agent, or Firm* — Studebaker & Brackett PC

(57) ABSTRACT

A knee-airbag-device attachment structure comprises knee-airbag devices and vehicle-body side brackets which connect the knee-airbag devices and hinge pillars of a vehicle body, respectively. This knee-airbag-device attachment structure further comprises an instrument-panel-member supporting-post side bracket which connects the knee-airbag device to an instrument-panel-member supporting post which is provided to extend between an instrument panel member and a tunnel portion of a floor panel.

11 Claims, 3 Drawing Sheets

(51) Int. Cl.
 *B60R 21/00* (2006.01)
 *B62D 25/04* (2006.01)

(56) References Cited

U.S. PATENT DOCUMENTS

| | | | | |
|---|---|---|---|---|
| 5,624,150 | A | * | 4/1997 | Venier ................... B62D 21/09 16/384 |
| 5,931,520 | A | * | 8/1999 | Seksaria ............... B60R 21/045 280/752 |
| 2001/0020797 | A1 | * | 9/2001 | Saeki ..................... B62D 25/04 296/203.03 |
| 2005/0006880 | A1 | * | 1/2005 | Nakayama ............ B60R 21/231 280/730.1 |
| 2005/0073134 | A1 | * | 4/2005 | Matsuura .............. B60R 21/206 280/730.1 |
| 2007/0200322 | A1 | * | 8/2007 | Sakakida .............. B60R 21/206 280/730.1 |
| 2008/0315611 | A1 | * | 12/2008 | Durocher ........... B62D 25/2018 296/72 |
| 2014/0001792 | A1 | * | 1/2014 | Aoki .................... B62D 25/145 296/193.09 |
| 2015/0014967 | A1 | | 1/2015 | Kang |

FOREIGN PATENT DOCUMENTS

| | | |
|---|---|---|
| JP | 2012-076531 A | 4/2012 |
| JP | 2014-210548 A | 11/2014 |

\* cited by examiner

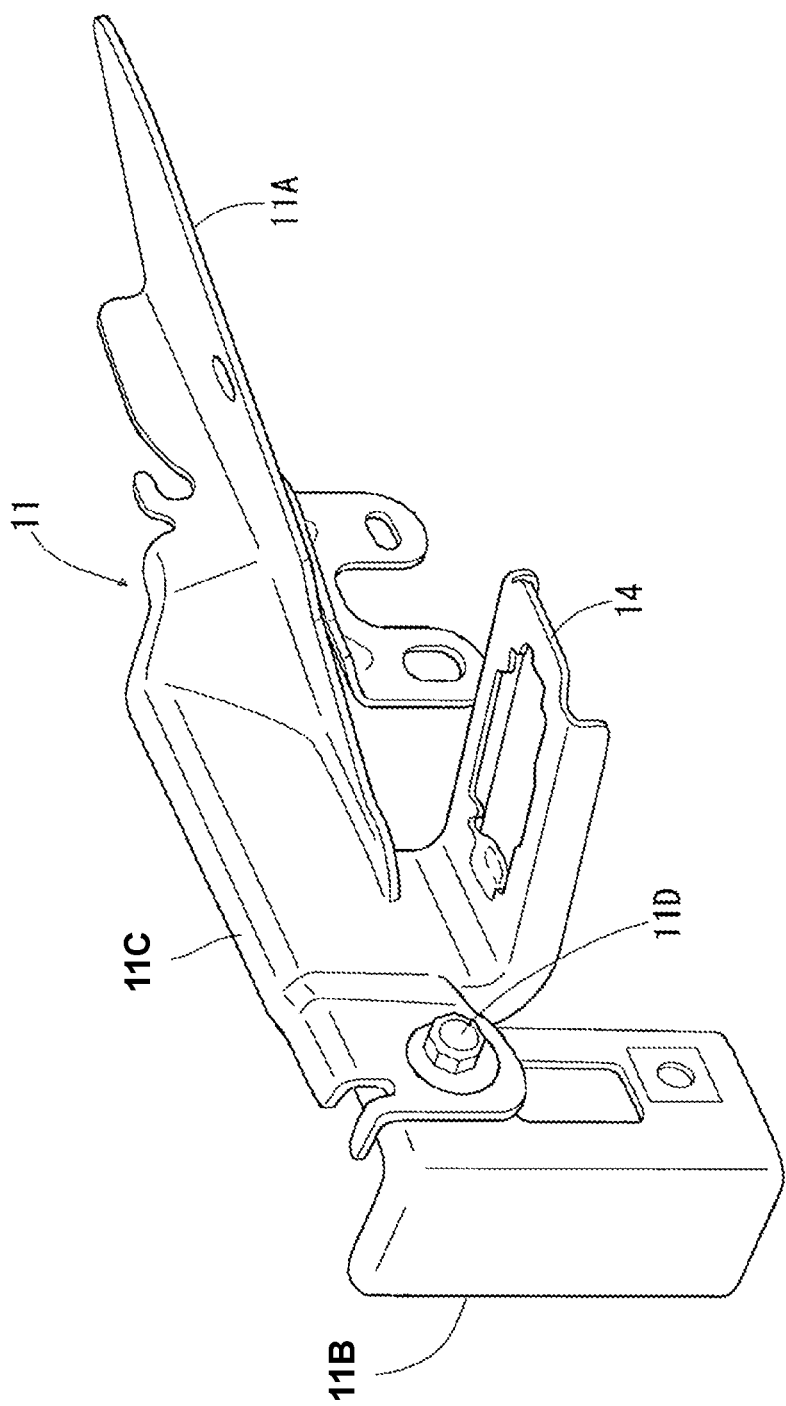

KNEE-AIRBAG-DEVICE ATTACHMENT STRUCTURE OF VEHICLE

BACKGROUND OF THE INVENTION

The present invention relates to a knee-airbag-device attachment structure of a vehicle.

A knee-airbag device to protect a knee of an occupant when an accident occurs in a vehicle collision or the like has been used in a vehicle, such as an automotive vehicle. The knee-airbag device is arranged in front of an occupant's seat so that an airbag is inflatable toward the knee of the occupant when the accident occurs.

Japanese Patent Laid-Open Publication No. 2014-210548, for example, discloses this kind of knee-airbag-device attachment structure in which a knee-airbag device is attached, via respective brackets, to an instrument panel reinforcement (instrument panel member) and a floor brace (instrument-panel-member supporting post) which is provided to extend from the instrument panel reinforcement to a tunnel portion of a floor panel. Further, Japanese Patent Laid-Open Publication No. 2012-76531 discloses a structure in which a knee-airbag device is attached to an instrument panel reinforcement via a bracket.

Herein, the knee-airbag device is required to inflate the airbag instantaneously (promptly) when the accident occurs, thereby protecting the occupant properly. Accordingly, since an attachment structure to support the knee-airbag device receives large impact during airbag inflation, it is needed that this attachment structure has the sufficiently large rigidity. However, if a support member of the attachment structure is configured to have a large plate thickness or a high-rigidity member is used as the support member of the attachment structure in order to increase the rigidity of the attachment structure, a vehicle weight so increases that the fuel economy (gas millage) of the vehicle or the like may deteriorate.

SUMMARY OF THE INVENTION

The present invention has been devised in view of the above-described matter, and an object of the present invention is to provide a knee-airbag-device attachment structure of a vehicle which can attain weight saving of the vehicle, securing the support rigidity during the knee-airbag inflation.

The present invention is a knee-airbag-device attachment structure of a vehicle, comprising a knee-airbag device to protect a knee of an occupant, and a vehicle-body side bracket connecting a vehicle body of the vehicle and the knee-airbag device.

According to the present invention, since the vehicle-body side bracket is the one to attach the knee-airbag device to the vehicle body which is positioned relatively closely to the knee-airbag devices (a hinge pillar of the vehicle, example), the length of the vehicle-body side bracket can be made properly short. Accordingly, even if the plate thickness of the vehicle-body side bracket is made large or the rigidity of the vehicle-body side bracket is made high by using the high-rigidity member, the weight increase can be properly suppressed because of the properly-short length of the vehicle-body side bracket. Thereby, securing of the high support rigidity and the weight saving can be compatibly attained for the attachment structure. Further, since the knee-airbag device is supported at the vehicle body via the vehicle-body side bracket, part of a load which is caused by inflation of a knee airbag is dispersed to the vehicle body having the high rigidity by way of the vehicle-body side bracket. Thereby, the load of the knee-airbag inflation can be properly supported at the vehicle body.

In an embodiment of the present invention, the knee-airbag-device attachment structure of the vehicle further comprises an instrument panel member extending in a vehicle width direction and fixed to side faces of both sides of the vehicle body, an instrument-panel-member supporting post extending upwardly from a vehicle floor and supporting the instrument panel member from below at a position between both-end fixation portions of the instrument panel member fixed to the vehicle body, and an instrument-panel-member supporting-post side bracket connecting the instrument-panel-member supporting post and the knee-airbag device.

According to this structure, the length of the instrument-panel-member supporting-post side bracket can be also properly short enough to attach the knee-airbag device to the instrument-panel-member supporting post which is positioned adjacently to the knee-airbag device, similarly to the above-described vehicle-boy side bracket. Thereby, the support rigidity of the attachment structure can be properly increased, attaining the weight saving of the attachment structure.

In another embodiment of the present invention, at least one of the vehicle-body side bracket and the instrument-panel-member supporting-post side bracket is configured to have a plate-shaped portion partially at least, wherein the plate-shaped portion is configured such that a plate face thereof is positioned substantially perpendicularly to a vehicle longitudinal direction.

According to this structure, the support rigidity, in a direction of the knee-airbag inflation (an obliquely downward direction), of the vehicle-body side bracket or the instrument-panel-member supporting-post side bracket can be properly increased.

In another embodiment of the present invention, the knee-airbag device is configured to extend in a vehicle width direction.

According to this structure, since both ends of the knee-airbag device are positioned closely to a side portion of the vehicle body and the instrument-panel-member supporting post, the respective lengths of the vehicle-boy side bracket and the instrument-panel-member supporting-post side bracket can be properly short, compared to a case where the knee-airbag device is supported at the instrument panel member or the like.

In another embodiment of the present invention, the vehicle-body side bracket comprises a knee-airbag side connection portion connected to the knee-airbag device, a vehicle-body side connection portion connected to the vehicle body, and an intermediate portion provided between the knee-airbag side connection portion and the vehicle-body side connection portion, wherein the intermediate portion is configured to extend in the vehicle width direction from the knee-airbag device to the vehicle body.

According to this structure, since the vehicle-body side bracket is attached to a portion of the vehicle body which is positioned adjacently (the most closely), in the vehicle width direction, to the knee-airbag device, the length of the vehicle-body side bracket can be properly minimized.

In another embodiment of the present invention, the vehicle-body side bracket is connected to a hinge pillar of the vehicle body.

According to this structure, the vehicle-body side bracket can be firmly supported at the hinge pillar having the large rigidity.

In another embodiment of the present invention, the instrument-panel-member supporting-post side bracket comprises a knee-airbag side connection portion connected to the knee-airbag device, an instrument-panel-member supporting-post side connection portion connected to the instrument-panel-member supporting post, and an intermediate portion provided between the knee-airbag side connection portion and the instrument-panel-member supporting-post side connection portion, wherein the intermediate portion is configured to extend in the vehicle width direction from the knee-airbag device to the instrument-panel-member supporting post.

According to this structure, since the instrument-panel-member supporting-post side bracket is attached to a portion of the instrument-panel-member supporting post which is positioned adjacently (the most closely), in the vehicle width direction, to the knee-airbag device, the length of the instrument-panel-member supporting-post side bracket can be properly minimized.

In another embodiment of the present invention, the instrument-panel-member supporting post is connected to a tunnel portion of the vehicle floor.

According to this structure, since the instrument-panel-member supporting post can be properly short, the support rigidity on the side of the instrument-panel-member supporting post can be properly increased.

Other features, aspects, and advantages of the present invention will become apparent from the following description which refers to the accompanying drawings.

BRIEF DESCRIPTION OF THE DRAWINGS

FIG. 3 is a perspective view showing a vehicle-body side bracket.

DETAILED DESCRIPTION OF THE INVENTION

Hereafter, an embodiment of the present invention will be described referring to the attached drawings.

Figure 1:
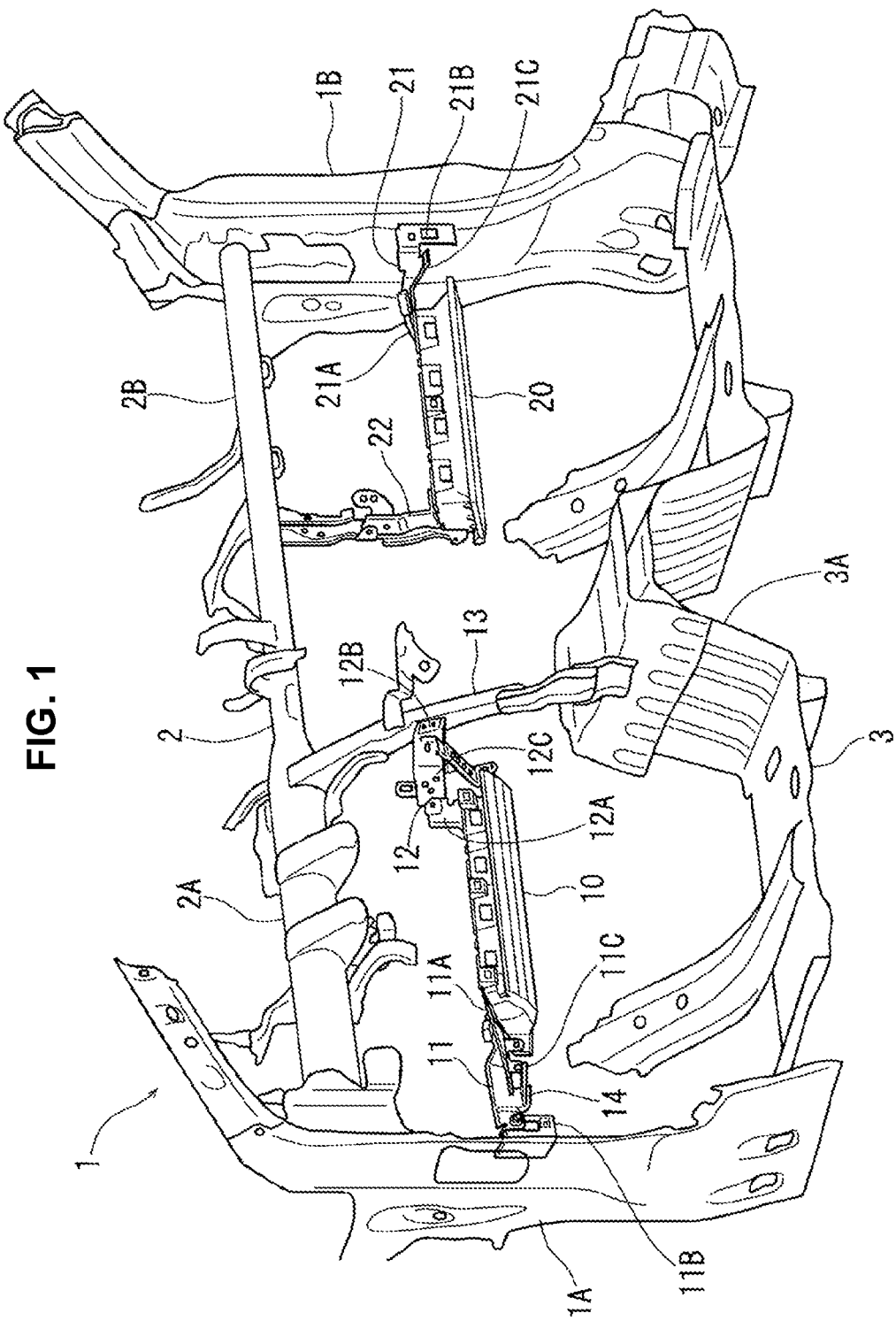
FIG. 1 is a perspective view showing a cabin front structure of a vehicle.
Figure 2:
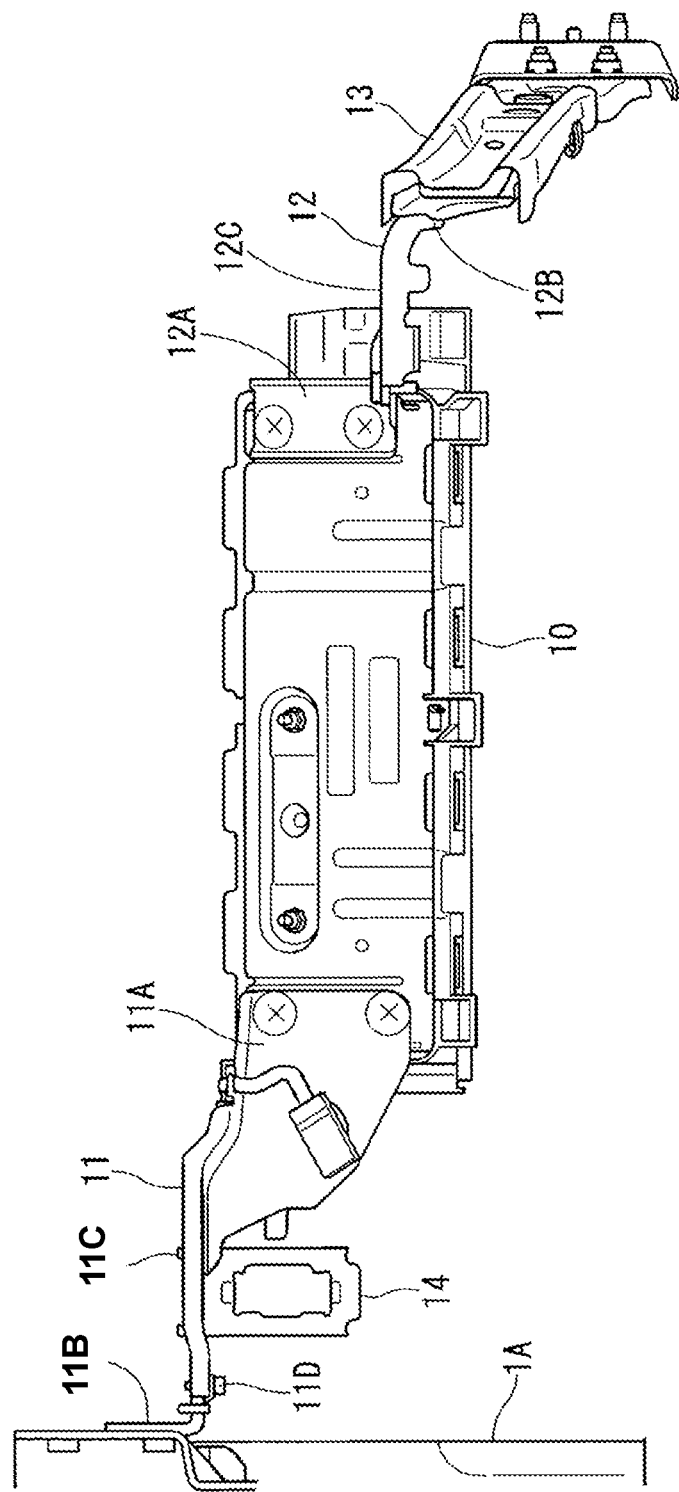
FIG. 2 is a plan view showing an example of a knee-airbag-device attachment structure of the present invention.

FIG. 1 shows a front structure of a cabin of a vehicle. FIG. 2 is a plan view showing an attachment structure of a driver's-seat side knee-airbag device. In the drawings, only members related to the attachment structure of the knee-airbag device of the present invention in the cabin front structure are shown and illustration of the other members is omitted.

As shown in the figures, an instrument panel member 2 is arranged between right-and-left hinge pillars 1A, 1B which constitute a part of a vehicle body 1. The instrument panel member 2 is made of a metal-made long member and arranged inside an instrument panel, not illustrated. The instrument panel member 2 is attached to the left hinge pillar 1A at an end portion of its driver's-seat side portion 2A (its left-side portion in FIG. 1), and is attached to the right hinge pillar 1B at an end portion of its assistant-driver's-seat side portion 2B (its right-side portion in FIG. 1), whereby the instrument panel member 2 is provided to extend in a vehicle width direction between the both-side portions 1A, 1B of the vehicle body 1.

Herein, the instrument panel member 2 is configured such that the driver's-seat side portion 2A which requires the higher mechanical strength has a larger diameter than the assistant-driver's-seat side portion 2B. The driver's-seat side portion 2A is configured such that a steering column, not illustrated, is attached to a central portion thereof.

A floor panel 3 is provided at a lower portion of the cabin and a tunnel portion 3A is formed at a central portion, in the vehicle width direction, of the floor panel 3. A driver's seat and an assistant driver's seat, which are not illustrated, are arranged on the floor panel 3 at positions located on right-and-left sides of the tunnel portion 3A.

The knee-airbag devices 10, 20 are respectively arranged in front of the driver's seat and the assistant driver's seat at respective positions which correspond to knees of occupants seated in those seats. Each of the knee-airbag devices 10, 20 includes an airbag inside thereof. This airbag is configured to be inflated by an inflator when the accident occurs and expand accordingly, breaking an outer frame (case) of each of the knee-airbag devices 10, 20, for the protection of the occupant's knees.

The driver's-seat side (left-side) knee-airbag device 10 is attached to the left hinge pillar 1A of the vehicle body 1 via a vehicle-body side bracket 11 at its left-side end, and this driver's-seat side (left-side) knee-airbag device 10 is also attached to an instrument-panel-member supporting post 13 via an instrument-panel-member supporting-post side bracket 12 at its right-side end. Meanwhile, the assistant-driver's-seat side (right-side) knee-airbag device 20 is attached to the right hinge pillar 1B of the vehicle body 1 via a vehicle-body side bracket 21 at its right-side end, and this assistant-driver's-seat side (right-side) knee-airbag device 20 is also attached to the instrument panel member 2 via an instrument-panel-member side bracket 22 at its left-side end.

Each of the knee-airbag devices 10, 20 is of a roughly rectangular solid shape and provided to extend roughly horizontally in the vehicle width direction (in a lateral direction). The vehicle-body side brackets 11, 21 are made of metal, for example, and as shown in FIG. 3 which illustrates the vehicle-body side bracket 11 only, these brackets 11, 21 respectively comprise knee-airbag side connection portions 11A, 21A which are connected to the knee-airbag devices 10, 20, vehicle-body side connection portions 11B, 21B which are connected to the hinge pillars 1A, 1B, and intermediate portions 11C, 21C which are provided at respective middle positions between the knee-airbag side connection portions 11A, 21A and the vehicle-body side connection portions 11B, 21B. The intermediate portions 11C, 21C of the vehicle-body side brackets 11, 12 are configured to extend roughly horizontally in the vehicle width direction from the knee-airbag devices 10, 20 toward the hinge pillars 1A, 1B.

Since the vehicle-body side brackets 11, 21 are attached to side portions (the hinge pillars 1A, 1B) of the vehicle body 1, each length of these brackets 11, 21 can be properly short. That is, since the knee-airbag devices 10, 20 are provided to extend in the vehicle width direction, each distance between the knee-airbag devices 10, 20 and the hinge pillars 1A, 1B is shorter than each distance between the knee-airbag devices 10, 20 and the instrument panel member 2, so that each length of these brackets 11, 21 can be properly short, compared to a case where the knee-airbag devices 10, 20 are connected to and supported at the instrument panel member 2. Further, since the intermediate portions 11C, 21C of the vehicle-body side brackets 11, 21 extend in the vehicle width direction and are attached to respective portions of the hinge pillars 1A, 1B which are positioned adjacently (the most closely), in the vehicle width direction, to the knee-airbag devices 11, 21, each length of the vehicle-body side brackets 11, 21 can be properly minimized. Accordingly, even if the plate thickness of each of the vehicle-body side brackets 11, 21 is made large or the rigidity of each of the vehicle-body side brackets 11, 21 is made high by using a high-rigidity member, the weight increase can be properly suppressed because of the properly-short length of each of the vehicle-body side brackets 11, 21, so that securing of the high support rigidity and the weight saving can be compatibly attained for the attachment structure.

Further, since the knee-airbag devices 10, 20 are respectively supported at the vehicle body 1 via the vehicle-body side brackets 11, 21, part of the inflation load of the knee airbags is dispersed to the vehicle body 1 having the large rigidity (the hinge pillars 1A, 1B) by way of the vehicle-body side brackets 11, 21. Accordingly, the inflation load of the airbags can be properly supported at the vehicle body 1. Moreover, load dispersion to the instrument panel member 2 which supports various members (the instrument panel, the steering column, and the like) and need to bear excessive loads accordingly can be made properly small.

Each of the intermediate portions 11C, 21C of the vehicle-body side brackets 11, 21 is of a plate shape, and this plate-shaped plate face is positioned substantially perpendicularly to the vehicle longitudinal direction (i.e., this plate-shaped plate face extends substantially in a vertical direction). Thereby, the support rigidity, in a direction of the knee-airbag inflation (i.e., in an obliquely-downward direction), of each of the vehicle-body side brackets 11, 21 can be properly increased.

In the present embodiment, the knee-airbag side connection portion 11A of the vehicle-body side bracket 11 is of a flat-plate shape, which is arranged along and fixed to an upper face of the knee-airbag device 10. Further, the vehicle-body side connection portion 11B and the intermediate portion 11C of the vehicle-body side bracket 11 are configured to be separate members from each other, which are connected together by a bolt 11D.

The vehicle-body side bracket 11 is provided with a connector attachment portion 14 where a connector for connecting an outside terminal is attached. This connector is an OBD (on-board diagnostics) connector (self-diagnosis connector), for example. The connector attachment portion 14 extends substantially horizontally toward a rearward side of the vehicle from a lower end of the intermediate portion 11C of the vehicle-body side bracket 11.

The instrument-panel-member supporting post 13 is connected to the instrument panel member 2 at its upper end and connected to a tunnel portion 3A at its lower end such that the instrument-panel-member supporting post 13 extends between the instrument panel member 2 and the tunnel portion 3A. An instrument-panel-member supporting-post side bracket 12, which is made of metal, for example, is connected to the vicinity of a right end portion of the knee-airbag device 10 at one end thereof and connected to the instrument-panel-member supporting post 13 at the other end thereof.

The instrument-panel-member supporting-post side bracket 12 comprises a knee-airbag side connection portion 12A which is connected to the knee-airbag device 10, an instrument-panel-member supporting-post side connection portion 12B which is connected to the instrument-panel-member supporting post 13, and an intermediate portion 12C which is provided between the knee-airbag side connection portion 12A and the instrument-panel-member supporting-post side connection portion 12B. In the present embodiment, the knee-airbag side connection portion 12A is connected to an upper face of the knee-airbag device 10 at its lower end, and extends upwardly of the knee-airbag device 10. The intermediate portion 12C extends horizontally in the vehicle width direction from an upper end of the knee-airbag side connection portion 12A to the instrument-panel-member supporting-post side connection portion 12B.

Thus, the instrument-panel-member supporting-post side bracket 12 which supports the knee-airbag device 10 together with the vehicle-body side bracket 11 is also attached to a portion of the instrument-panel-member supporting post 13 which is positioned adjacently to the knee-airbag device 10. Accordingly, the length of the instrument-panel-member supporting-post side bracket 12 (the intermediate portion 12C) can be properly minimized as well as the vehicle-body side bracket 11, so that the support rigidity of the attachment structure can be properly increased, attaining the weight saving.

The intermediate portion 12C of the instrument-panel-member supporting-post side bracket 12 is of the plate shape, and this plate-shaped plate face is positioned substantially perpendicularly to the vehicle longitudinal direction (i.e., this plate-shaped plate face extends substantially in the vertical direction). Thereby, the support rigidity, in the direction of the knee-airbag inflation (the obliquely-downward direction), of this bracket 12 can be properly increased.

The present invention should not be limited to the above-described embodiment and any other modifications or improvements may be applied within the scope of a spirit of the present invention. For example, the specific shapes of the vehicle-body side brackets are not limited to the shapes of the vehicle-body side brackets 11, 21 of the above-described embodiment. The vehicle-body side connection portion 11B and the intermediate portion 11C may be made of a single member, not the separate members, for example.

What is claimed is:

1. A knee-airbag-device attachment structure of a vehicle, comprising:
    a knee-airbag device to protect a knee of an occupant; and
    a vehicle-body side bracket connecting a vehicle body of the vehicle and the knee-airbag device;
    wherein said vehicle-body side bracket comprises a knee-airbag side connection portion connected to the knee-airbag device, a vehicle-body side connection portion connected to the vehicle body, and an intermediate portion provided between the knee-airbag side connection portion and the vehicle-body side connection portion, wherein the intermediate portion is configured to extend in the vehicle width direction from the knee-airbag device to the vehicle body;
    wherein the intermediate portion comprises a plate-shaped portion having a plate face positioned substantially perpendicularly to a vehicle longitudinal direction and extending substantially in a vertical direction; and
    wherein the knee-airbag side connection portion of the vehicle-body side bracket has a flat-plate shape and extends in a direction between the substantially vertical direction of the plate face of the intermediate portion and a horizontal direction.

2. The knee-airbag-device attachment structure of the vehicle of claim 1, further comprising:
    an instrument panel member extending in a vehicle width direction from a first side to a second side of the vehicle body and fixed to side faces of the first and second sides of the vehicle body;
    an instrument-panel-member supporting post extending upwardly from a vehicle floor and supporting the instrument panel member from below at a position between the side faces of the first and second sides of the vehicle body; and an instrument-panel-member supporting-post side bracket connecting the instrument-panel-member supporting post and said knee-airbag device.

3. The knee-airbag-device attachment structure of the vehicle of claim 2, wherein said instrument-panel-member supporting-post side bracket is configured to have a plate-shaped portion at least partially, wherein the plate-shaped portion is configured such that a plate face thereof is positioned substantially perpendicularly to a vehicle longitudinal direction.

4. The knee-airbag-device attachment structure of the vehicle of claim 2, wherein said knee-airbag device is configured to extend in a vehicle width direction.

5. The knee-airbag-device attachment structure of the vehicle of claim 4, wherein said vehicle-body side bracket is connected to a hinge pillar of the vehicle body.

6. The knee-airbag-device attachment structure of the vehicle of claim 2, wherein said vehicle-body side bracket is connected to a hinge pillar of the vehicle body.

7. The knee-airbag-device attachment structure of the vehicle of claim 2, wherein said instrument-panel-member supporting-post side bracket comprises a knee-airbag side connection portion connected to the knee-airbag device, an instrument-panel-member supporting-post side connection portion connected to the instrument-panel-member supporting post, and an intermediate portion provided between the knee-airbag side connection portion and the instrument-panel-member supporting-post side connection portion, wherein the intermediate portion is configured to extend in the vehicle width direction from the knee-airbag device to the instrument-panel-member supporting post.

8. The knee-airbag-device attachment structure of the vehicle of claim 7,
wherein said instrument-panel-member supporting-post side bracket is configured to have a plate-shaped portion at least partially, wherein the plate-shaped portion is configured such that a plate face thereof is positioned substantially perpendicularly to a vehicle longitudinal direction.

9. The knee-airbag-device attachment structure of the vehicle of claim 8, wherein said instrument-panel-member supporting post is connected to a tunnel portion of the vehicle floor.

10. The knee-airbag-device attachment structure of the vehicle of claim 2, wherein said instrument-panel-member supporting post is connected to a tunnel portion of the vehicle floor.

11. The knee-airbag-device attachment structure of the vehicle of claim 1, wherein the knee-airbag side connection portion of the vehicle-body side bracket extends in the direction between the substantially vertical direction of the plate face of the intermediate portion and the horizontal direction such that the knee-airbag device extends substantially horizontally in the vehicle width direction.

\* \* \* \* \*